United States Patent
Lee (10) Patent No.: US 6,667,779 B2
(45) Date of Patent: Dec. 23, 2003

(54) STRUCTURE FOR PREVENTING AN OPEN LINE IN A LAMP CABLE OF LIQUID CRYSTAL DISPLAY DEVICE FOR A COMPUTER

(75) Inventor: Joung-Jae Lee, Kumi-shi (KR)

(73) Assignee: LG. Philips LCD Co., Ltd., Seoul (KR)

(*) Notice: Subject to any disclaimer, the term of this patent is extended or adjusted under 35 U.S.C. 154(b) by 89 days.

(21) Appl. No.: 09/749,454

(22) Filed: Dec. 28, 2000

(65) Prior Publication Data

US 2001/0017673 A1 Aug. 30, 2001

(30) Foreign Application Priority Data

Dec. 31, 1999 (KR) .......................................... 1999-67840

(51) Int. Cl.[7] ................................................ G02F 1/13
(52) U.S. Cl. .......................................... 349/58; 349/65
(58) Field of Search ...................... 349/58, 65

(56) References Cited

U.S. PATENT DOCUMENTS

| | | | |
|---|---|---|---|
| 5,280,372 A | * 1/1994 | Horiuchi | 349/58 |
| 5,299,038 A | * 3/1994 | Hamada et al. | 349/58 |
| 5,375,005 A | * 12/1994 | Komano | 349/58 |
| 5,666,172 A | * 9/1997 | Ida et al. | 349/58 |
| 5,729,310 A | * 3/1998 | Horiuchi et al. | 349/58 |
| 5,946,062 A | * 8/1999 | Hasegawa et al. | 349/58 |
| 6,016,175 A | * 1/2000 | Kim | 349/58 |
| 6,064,455 A | * 5/2000 | Kim | 349/58 |

* cited by examiner

*Primary Examiner*—James Dudek
(74) *Attorney, Agent, or Firm*—McKenna Long & Aldridge LLP (57) ABSTRACT

The liquid crystal display module having a back light lamp includes a cable guide for guiding cables connected to both ends of the lamp toward an inverter board in order to prevent the cables from breaking. To form the cable guide, a cover or a supporting frame of the module includes a protruded portion and an opening for passing the cables therethrough.

26 Claims, 11 Drawing Sheets

STRUCTURE FOR PREVENTING AN OPEN LINE IN A LAMP CABLE OF LIQUID CRYSTAL DISPLAY DEVICE FOR A COMPUTER

This application claims the benefit of Korean Patent Application No. 1999-67840 filed on Dec. 31, 1999, which is hereby incorporated by reference for all purposes as if fully set forth herein.

BACKGROUND OF THE INVENTION

1. Field of the Invention

The present invention relates to a liquid crystal display module, and more particularly, to the module including a back light device having cables.

2. Discussion of the Related Art

Figure 1:
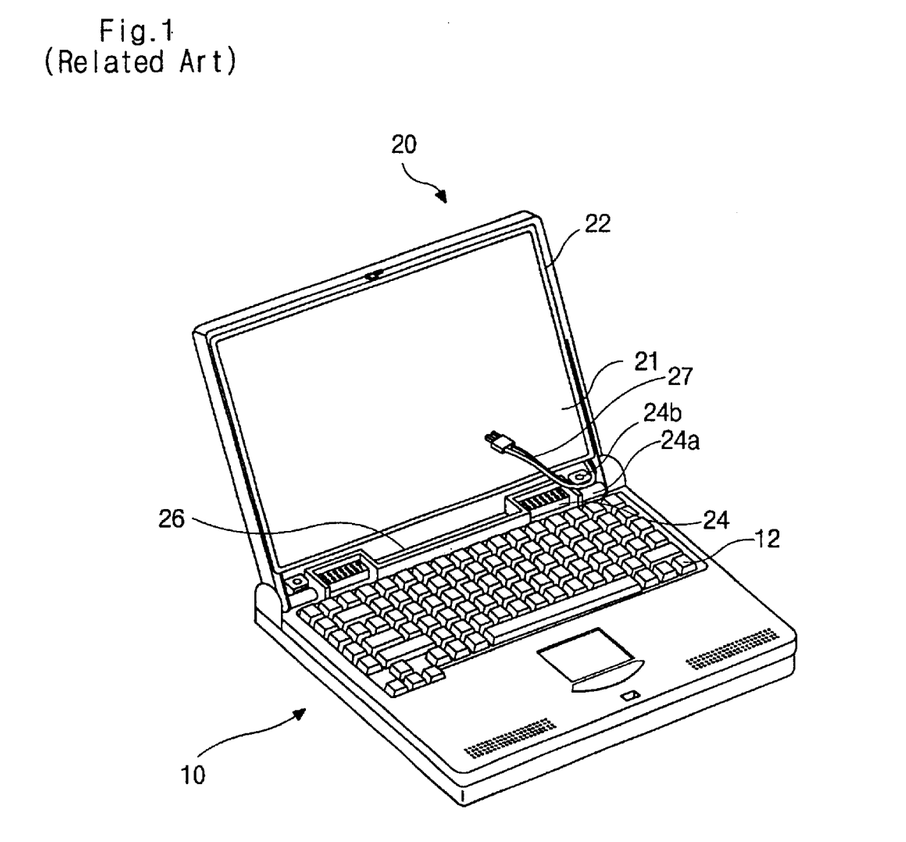
FIG. 1 is a perspective view showing a general portable computer.

Referring to FIG. 1, a general portable computer such as a laptop or notebook computer typically includes a body 10, a liquid crystal display device assembly 20 coupled to the body 10 via a hinge mechanism 24. The liquid crystal display assembly 20 has a liquid crystal display module 21 and a display case 22 supporting the module 130. The body 10 has an input device 12 such as a keyboard. Though the case 22 includes front and rear cases, in FIG. 1, the front case is omitted for explanation.

Figure 2:
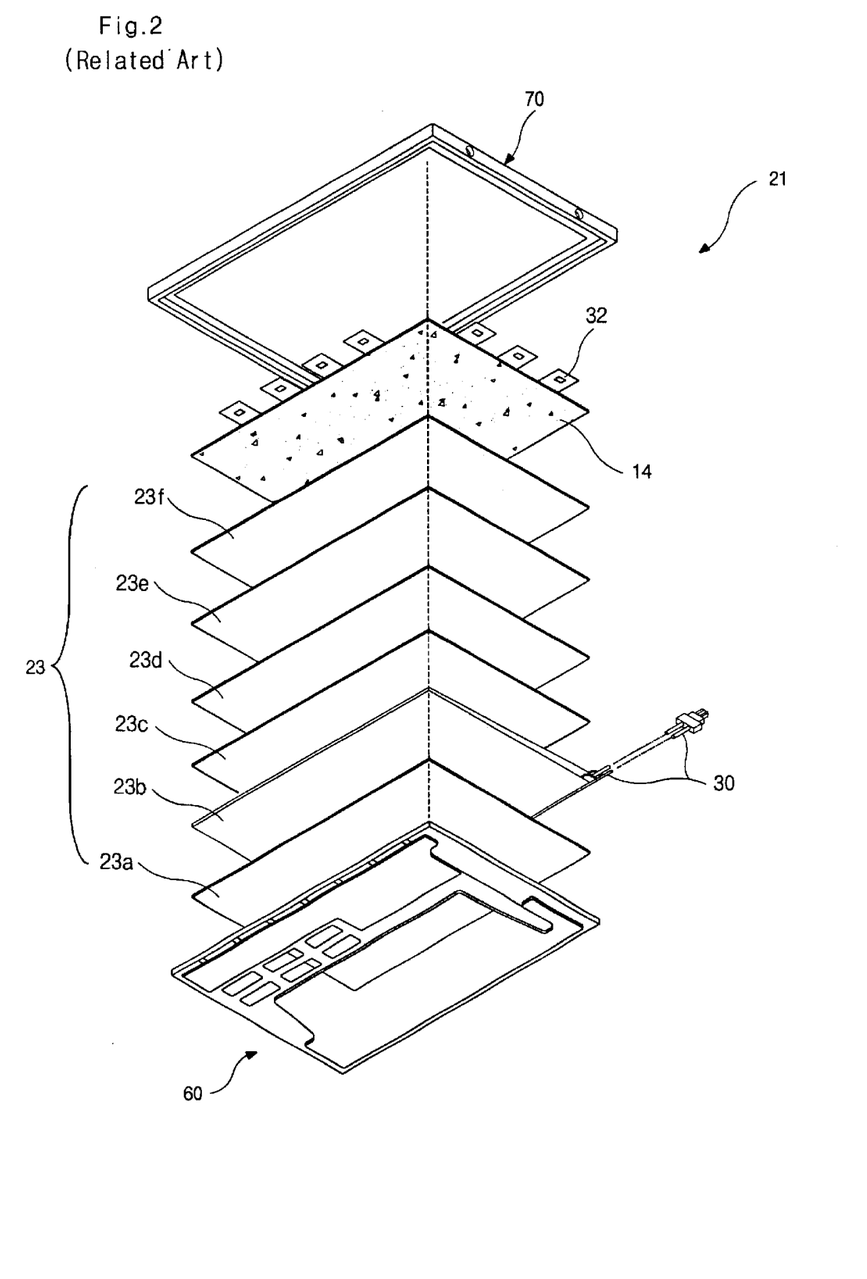
FIG. 2 is an exploded perspective view showing a mounting structure of an LCD device for a portable computer.

FIG. 2 is an exploded perspective view of a liquid crystal display module 21. The liquid crystal display module 21 includes a back light device 23 and a liquid crystal display panel 14 having printed circuit boards 32. The back light device 23 and the liquid crystal display panel 14 are attached to each other via a main frame 60 and a top frame 70. The main frame 60 is typically made of a plastic material and supported by a cover 80 (see FIG. 5). The back light device 23 includes a reflective plate 23a, a waveguide plate 23b, a first diffuser/protecting sheet 23c, a first prism sheet 23d, a second prism sheet 23e, and a second diffuser/protecting sheet 23f, which are all stacked on each other in the above-described order. The main frame 60 is coupled to the top frame 70 with the liquid crystal panel 14 and the back light device 23 interposed therebetween.

Hereinafter, detailed structures of the back light device 23, the main frame 60, and the top or metal frame 70 will be explained.

Figure 3:
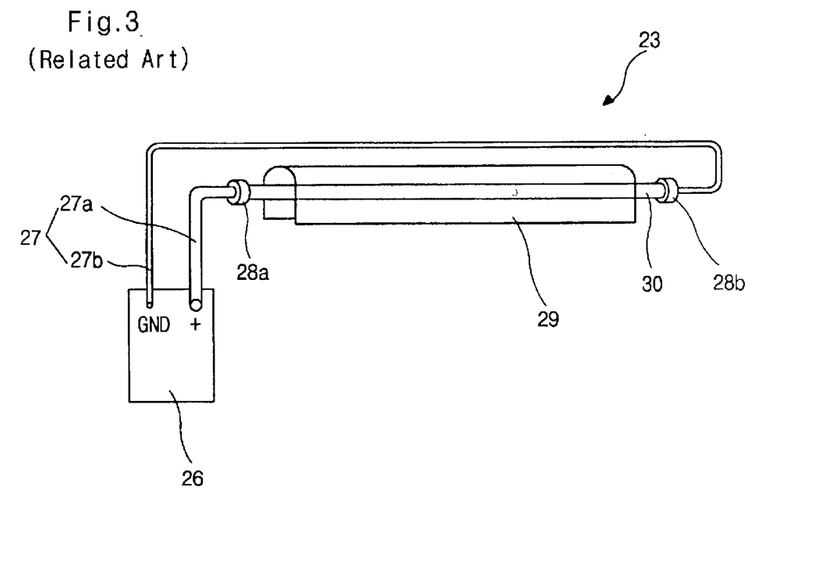
FIG. 3 is schematic view of a back light device.

FIG. 3 is a schematic view of the back light device according to the related art. The back light device 23 includes a lamp 30, a lamp housing 29 collecting and reflecting the light from the lamp 30, an inverter board 26 acting as an electric source to turn ON/OFF the lamp 30, cables 27a and 27b transmitting the voltage from the inverter board 26 to the lamp 30, and two sockets 28a and 28b connecting the cables 27a and 27b and the lamp 30.

The one socket 28a is generally fixed and the other one 28b is detachable in order to exchange the lamp 30. The cables 27a and 27b can have a heat-shrinkable tube. The thicker one, cable 27a for high voltage, is fixed to the lamp 30 by soldering, and connected to the inverter board 26 by soldering or through a connector (not shown).

Figure 4:
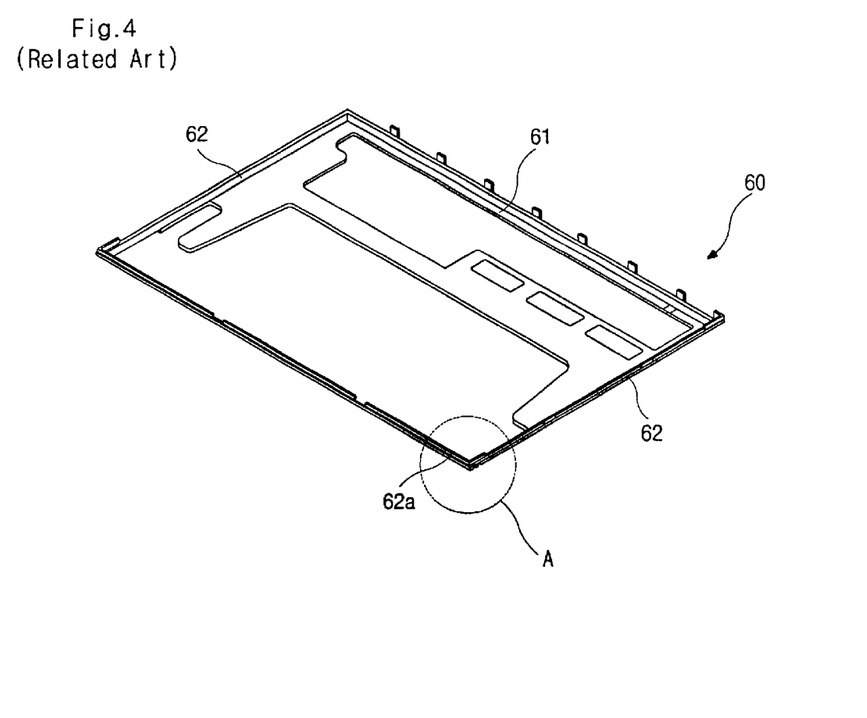
FIG. 4 is a perspective view illustrating a main frame.

FIG. 4 shows a structure of the main frame 60 which is generally made of plastic material. The main frame 60 has a bottom surface portion 61 and a side surface portion 62 elongated from the peripheral edges, and supports the back light device 23 and the liquid crystal display panel 14. The back light device 23 is especially supported by one surface 62a of the side surface portion 62.

Figure 5:
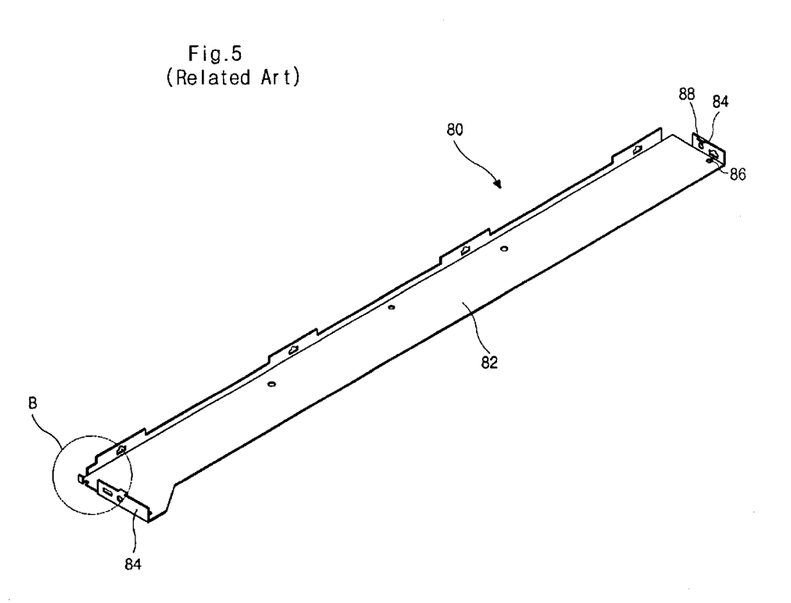
FIG. 5 is a perspective view illustrating a lower cover.

FIG. 5 shows a cover or lower cover 80. The lower cover 80 has a plane portion 82 as a main portion and a pair of vertical portions 84 bent from the plane portion 82. The plane portion 82 has a first screw hole 86 for connecting the cover 80 and the main frame 60. Each vertical portion 84 has a second screw for connecting the metal frame 70 and the cover 80. The lower cover 80 supports the main frame 60 along the longitudinal direction of the lamp 30 of the back light device 23, and protects against bending or wrinkling of the main frame 60. To this end, the lower cover 80 is made of a stainless steel. The lower cover 80 can be mounted further or reside alone near the printed circuit board at the opposite side of the location of the lamp 30.

Figure 6:
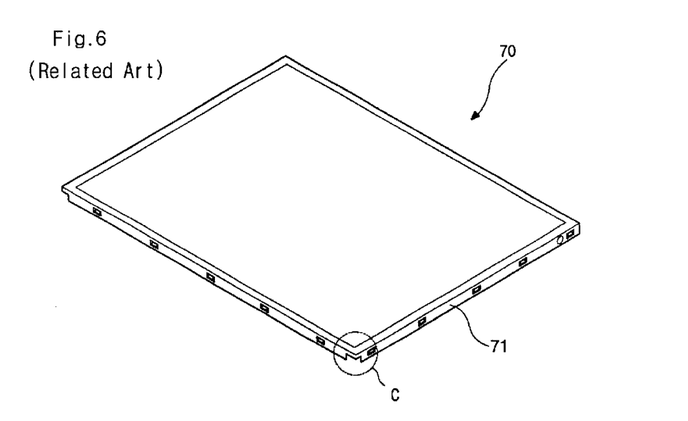
FIG. 6 is a perspective view illustrating a metal frame.

FIG. 6 shows structure of the metal frame 70 which is for assembling the liquid crystal assembly 20 at the final step. The metal frame 70 has bent portions toward the main frame 60 and is assembled to the main frame 60 and the rear case 22 (see FIG. 1).

The areas "A", "B", and "C" of FIGS. 4, 5, and 6, respectively, designate a passage for the cables 27 of the back light device 23.

Figure 7:
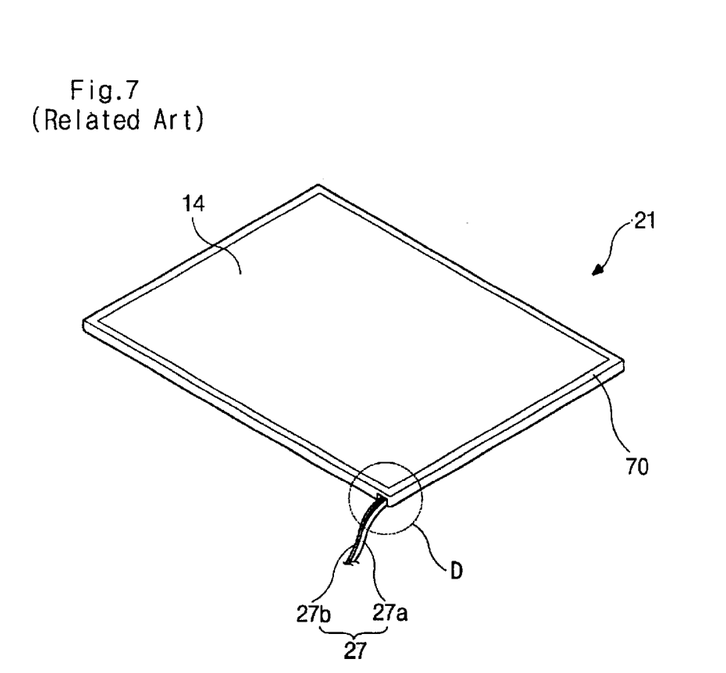
FIG. 7 is a perspective view illustrating an assembled module.

FIG. 7 shows an assembled liquid crystal display module 21. The square shaped liquid crystal panel 14 is surrounded by the metal frame 70 at the upper portion thereof, and has the back light device at the lower portion thereof. Both cables 27a and 27b transmitting voltage to the back light device 23 from the inverter board 26 are located outside of the liquid crystal module 21 through the passage around a corner thereof. Though each of the cables 27a and 27b are connected to the corresponding ends of the lamp 30, since the liquid crystal display assembly 20 (see FIG. 1) tends to become more compact and thinner, if one of the cables 27a and 27b is located at the opposite end of the passage, the whole size of the liquid crystal assembly 20 becomes larger.

The structure of the assembly 21 usually adopted for a portable computer as described above has following problems.

First, during transporting, packing, or manufacturing the liquid crystal module, when connecting the inverter board and the connectors (not shown) with the cable or handling the cable for any other reasons, external forces can be transmitted to the soldering portion between the lamp and the cable, leading to a disconnection between them.

Second, while mounting the liquid crystal display assembly to a portable computer shown in FIG. 1, the cable of the back light device can contact the hinge frame, thus the skin of the heat-shrinkable tube or wire cable can rip or be damaged.

Third, as shown in FIG. 1, since the inverter board of the portable or laptop computer is positioned near the center of one side of the liquid crystal module, the cable detours around the connecting member extended from the hinge frame and is connected to the inverter board via the space between the hinge mechanism and the liquid crystal assembly, which is a complicated arrangement.

These problems have a limit to be overcome by a design change, since the display assembly tends to be more compact or thinner.

SUMMARY OF THE INVENTION

Accordingly, the present invention is directed to a liquid crystal module for a computer that substantially obviates one or more of the problems due to limitations and disadvantages of the related art.

An object of the present invention is to provide a liquid crystal display module having a structure that can obviate undesired or accidental disconnection of the cable of the back light device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides, in one embodiment, a liquid crystal display module including: a display panel having side surfaces and a top surface having a display region; a back light device having a lamp supplying light to the display panel, the lamp having a cable; a first frame covering peripheral portions of the top surface and side portions of the display panel; a second frame supporting the display panel and the back light device with the first frame, the second frame having a main surface and a side wall extended and bent from the main surface; and a guide member guiding the cable of the lamp.

The guide member is fixed to the second frame and has a stainless steel. The guide member has a first surface portion assembled to the second frame, and a second surface portion extended and bent from the first surface portion, the second surface portion facing and contacting the side wall of the second frame.

The guide member guides the cable connected to an end of the lamp towards a longitudinal center of the lamp. The second surface portion of the guide member extends along the longitudinal direction of the lamp, a portion of the second surface portion positioned at an end of the lamp has an opening as a passage of the cable and a protrusion for guiding the cable toward the opening. The first and/or second frames can have a protrusion corresponding to the protrusion of the guide member.

In another embodiment, the present invention provides a liquid crystal display module including a liquid crystal panel having a display region; a back light device having a lamp supplying light to the panel, the lamp having cables at both ends thereof; a first frame having a first portion covering a peripheral portion of the display region and a second portion covering a side surface of the panel; a second frame having an inner surface, an outer surface and a side surface, and supporting the panel and the back light device with the first frame; and a fixing unit positioned at a corresponding position of the lamp of the back light device, and having a first surface portion contacting the outer surface of the second frame and a second surface portion having a guiding portion guiding cables of the lamp toward a longitudinal center of the lamp.

The second surface portion of the fixing unit contacts the side surface of the second frame, and has a protruded shape having an opening headed to the center of the lamp.

In a further embodiment, the present invention provides a liquid crystal display module comprising a liquid crystal display panel having a display region; a back light device having a lamp supplying light to the panel, the lamp having cables at both ends thereof; a first frame having a first portion covering a peripheral portion of the display region and a second portion covering a side surface of the panel; a second frame supporting the panel and the back light device with the first frame; and a fixing unit positioned at a corresponding position of the lamp, fixed to the second frame, elongated in a longitudinal direction of the lamp to define a side of the second frame, and having a guide portion guiding the cables to a center of the lamp.

In a further embodiment, the present invention provides a liquid crystal display module comprising a liquid crystal display panel having a display region; a back light device having a lamp supplying light to the panel, the lamp having cables at both ends thereof; a first frame having a first portion covering a peripheral portion of the display region, a second portion covering a side surface of the panel, and a third portion guiding the cables of the lamp from the ends of the lamp to a center of the lamp; and a second frame supporting the panel and the back light device with the first frame.

The third portion or guiding portion of the first frame is positioned at the second portion of the first frame, has a protruded shape at one end of the lamp, and the protruded shape has an opening for cables headed toward the center of the lamp. The liquid crystal display module further includes a fixing unit having a first surface portion fixed to the second frame, a second surface portion substantially perpendicular to the first surface portion, and a passage corresponding to the opening of the third portion of the first frame.

In a further embodiment, the present invention provides a computer comprising a liquid crystal display module including a) a liquid crystal display panel having a display region b) a back light device having a lamp supplying light to the panel, the lamp having cables at both ends thereof c) a first frame having a first portion covering a peripheral portion of the display region, a second portion covering a side surface of the panel and a third portion guiding the cables of the lamp d) a second frame supporting the panel and the back light device with the first frame; a case for holding the display module; an inverter board supplying electricity to the lamp of the back light device through the cables; a system body assembled with the display module via a hinge mechanism; and wherein the third portion of the first frame guides the cables toward the inverter board.

In a further embodiment, the present invention provides a computer comprising a liquid crystal display module including a) a liquid crystal display panel having a display region, b) a back light device having a lamp supplying light to the panel, the lamp having cables at both ends thereof, c) a first frame having a first portion covering a peripheral portion of the display region and a second portion covering a side surface of the panel, d) a second frame supporting the panel and the back light device with the first frame, and e) a guide member guiding the cables of the lamp; a case holding the display module; an inverter board supplying electricity to the lamp of the back light device through the cables; a system body assembled with the display module via a hinge mechanism; and wherein the guide member guides the cables toward the inverter board.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, an example of which is illustrated in the accompanying drawings, in which like numerals denote like elements and explanation of the same elements to those of the conventional art is abbreviated.

Figure 8:
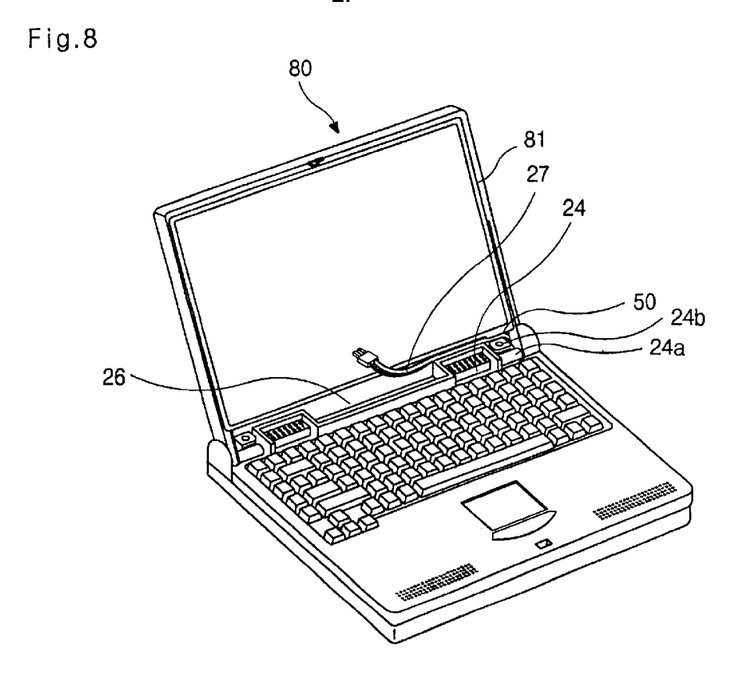
FIG. 8 is a perspective view illustrating a portable computer according to an embodiment of the invention.

FIG. 8 is a perspective view of a portable computer according to an embodiment of the invention. The lamp 30 (see FIG. 3) is arranged along one side of the liquid crystal module 81 near the hinge mechanism 24 and the inverter 26. In FIG. 8, the cable for high voltage ("first cable") 27a (see FIG. 3) is fixed to the right end of the lamp 30 and the cable for low voltage ("second cable") 27b (see FIG. 3) is fixed to the left end of the lamp 30. The second cable 27b extends along the lamp 30 to the right end of the lamp 30. The cables 27a and 27b come out of the back light device 23 (see FIG. 9) though the outlet portion or cable guide 50 positioned at the right end of the lamp 30. The outlet portion or cable guide 50 guides the cables 27a and 27b toward the inverter 26 positioned near the center of the lamp 30 at the outside of the module 81.

Figure 9:
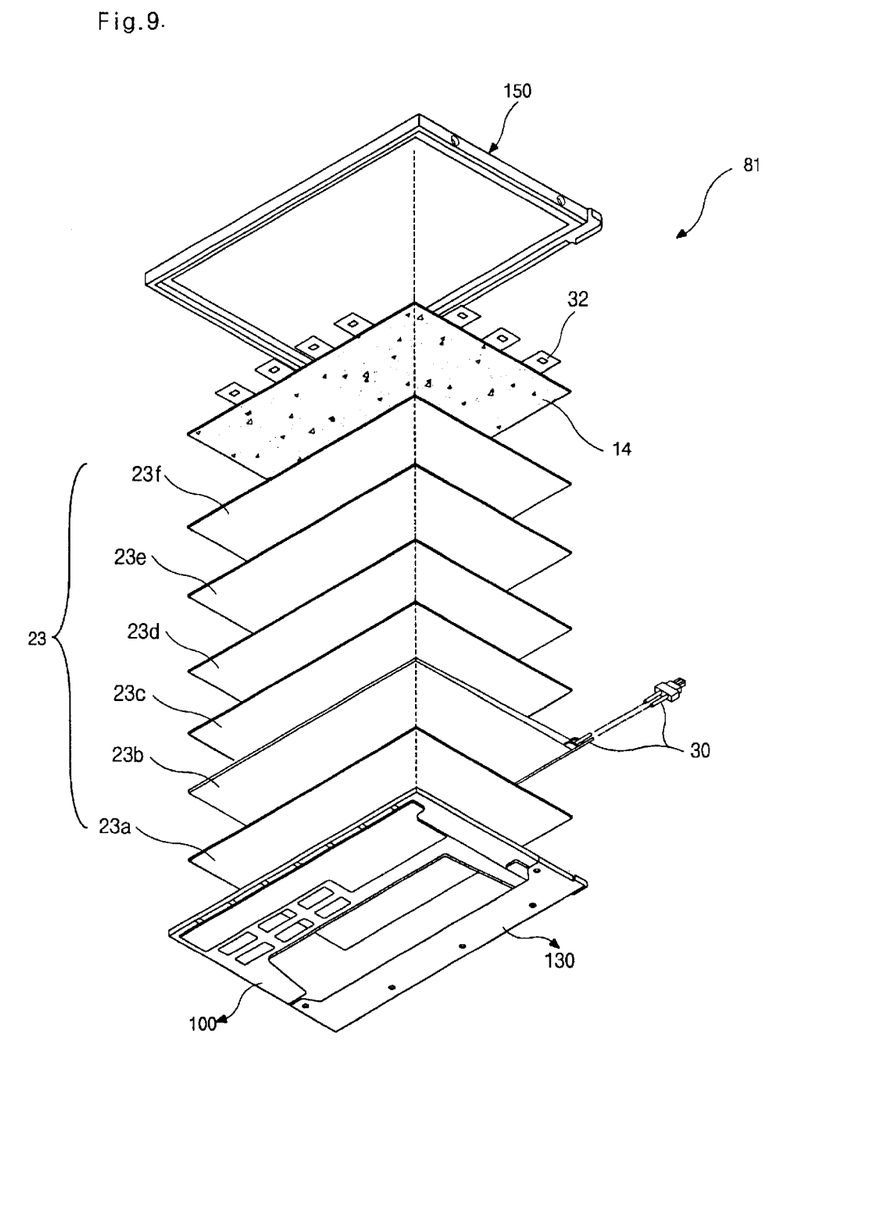
FIG. 9 is an exploded view illustrating a liquid crystal module according to an embodiment of the invention.

FIG. 9 is an exploded view of the liquid crystal display module 81 according to an embodiment of the invention. When compared with the liquid crystal display module shown in FIG. 2, a lower cover 130 assembled to the second or main frame 100 is added to the liquid crystal display module 81. Each structure of the elements of the liquid crystal display module 81 shown in FIG. 9 will be provided.

Figure 10:
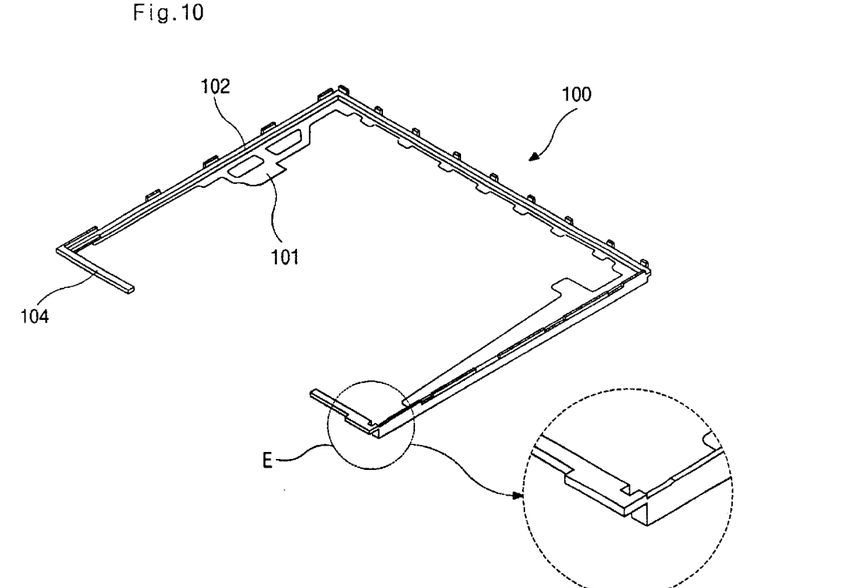
FIG. 10 is a perspective view illustrating a main frame of the module according to an embodiment of the invention.

FIG. 10 shows a main frame 100 according to an embodiment of the invention. The main frame 100 has a rectangular shape but one side is missing (the corresponding side 62a is shown in FIG. 4) at a corresponding position of lamp 30 (see FIG. 3) when compared to the main frame 60 shown in FIG. 4. This is to ensure a space for the outlet portion or cable guide 50 (see FIG. 8) and the vacant side can be substituted by the cover 130 (see FIG. 9). That is, if the size of the liquid crystal display assembly 80 (see FIG. 8) is constant, in order to form a protruded outlet portion or cable guide 50 between the space hinge frame 24a and the liquid crystal display module 81 (see FIG. 8), the size of the liquid crystal display module 81 must get smaller. Therefore, to ensure the space for the outlet portion or cable guide 50 while maintaining the size of the module 81, one side of the rectangular shape of the main frame 100 needs to be abbreviated.

Instead of a whole side corresponding to the other sides 102, a supporting member 104 having a side shape is provided in the main frame 100. The supporting member 104 is as high as the other sides 102, but the lower part of the supporting member 104 is empty or vacant in order to provide a passage for the cables 27a and 27b (see FIG. 3). That is, there is no corresponding portion to the bottom portion 101 of other sides. It also has a protruded portion "E" for the protruded outlet portion or cable guide 50.

Figure 11:
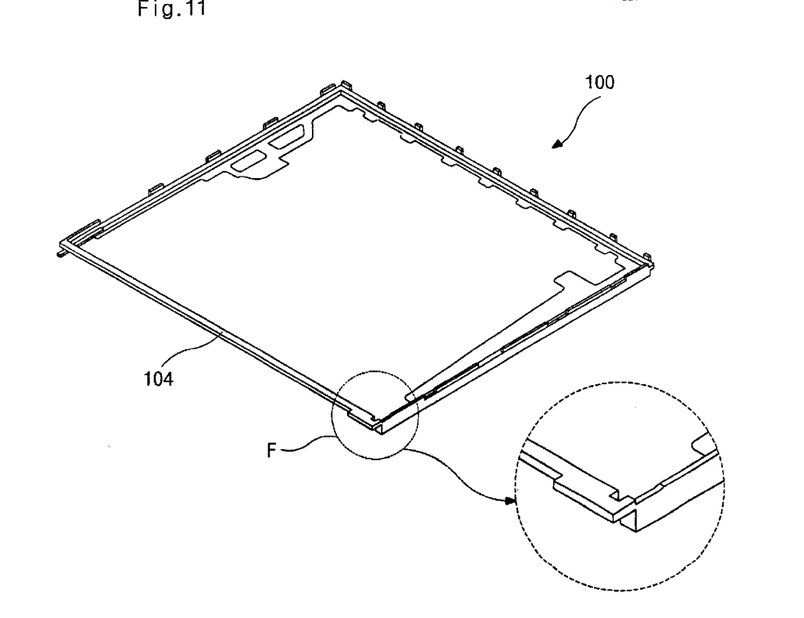
FIG. 11 is a perspective view illustrating a modification of a main frame of the module according to an embodiment of the invention.

FIG. 11 shows a modified example of the main frame 100. The one side of the main frame 100 is floating as the supporting member 104 of FIG. 10, but the floating side or supporting member 104 forms a whole side. It also has a protruded portion "F" for the outlet portion or cable guide 50, and the space defined by the floating side is for providing a passage for the cables 27a and 27b.

Figure 12:
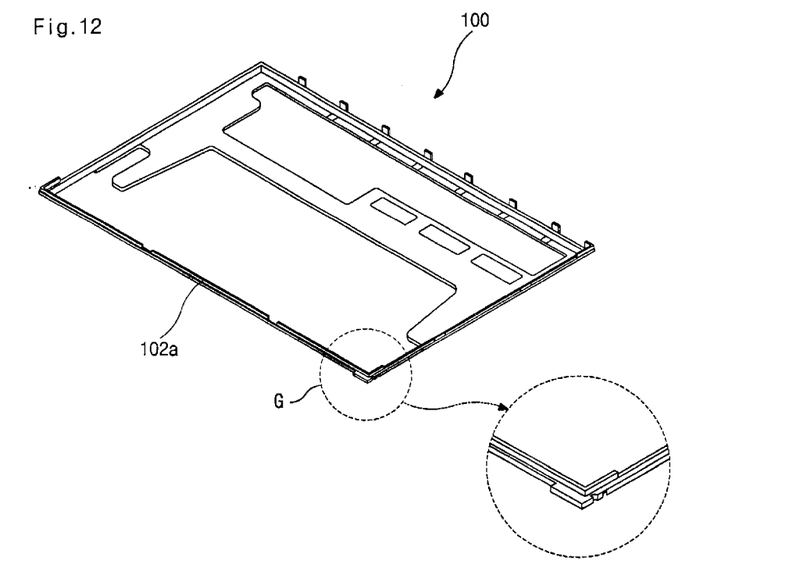
FIG. 12 is a perspective view illustrating another modification of a main frame of the module according to an embodiment of the invention.

FIG. 12 shows another embodiment of a main frame according to an embodiment of the invention. This frame has a whole side 102a like that shown in FIG. 4 without a floating side with space therebelow, but it also has a protrusion portion "G" for the outlet portion or cable guide 50.

Figure 13:
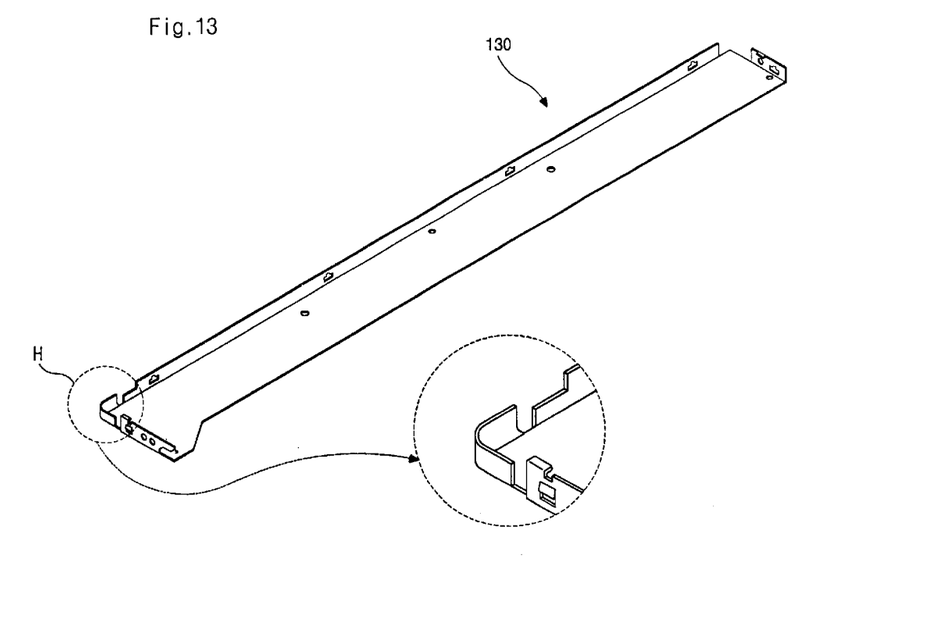
FIG. 13 is a perspective view illustrating a cover of the module according to an embodiment of the invention.

FIG. 13 shows a lower cover 130 according to an embodiment of the invention. The lower cover 130 extends along the longitudinal direction of the lamp 30 and has a protruded portion "H", which substantially forms the outlet portion or cable guide 50 of FIG. 8. The protruded portion "H" has an outlet toward a center of the side i.e. the lamp 30 (see FIG. 3), which corresponds to the protruded portions "E", "F", and "G" of FIGS. 10 to 12, respectively.

Figure 14:
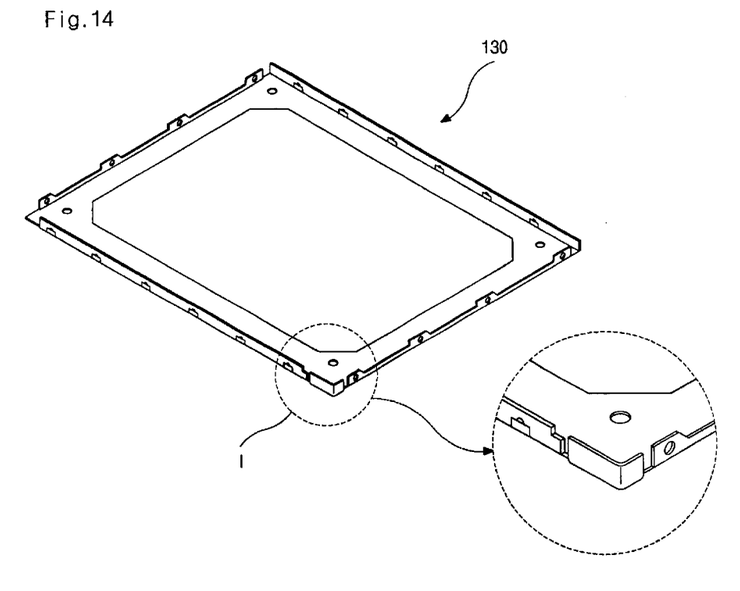
FIG. 14 is a perspective view illustrating a modification of a cover of the module according to an embodiment of the invention.

FIG. 14 is a modification of the cover according to the invention. The lower cover 130 has a rectangular shape and supports the main frame 100 as a whole, and has a protruded portion "I" for forming the outlet portion or cable guide 50.

Figure 15:
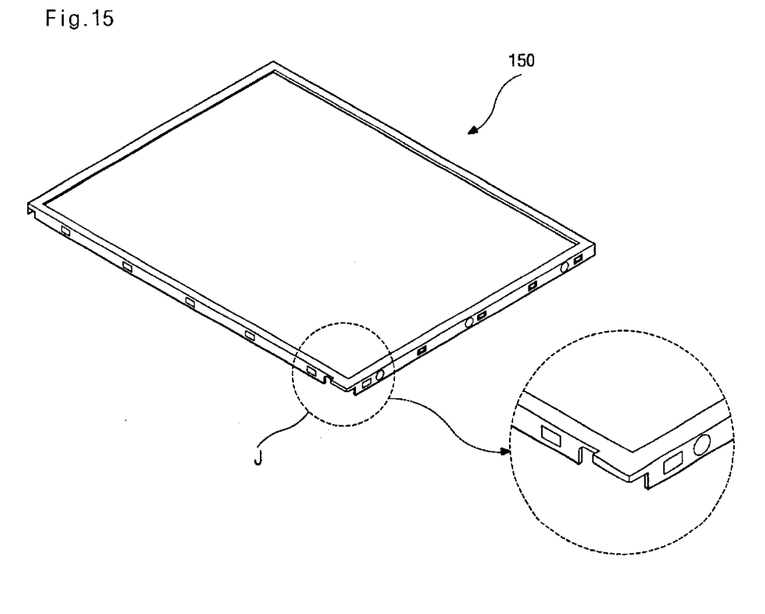
FIG. 15 is a perspective view illustrating a metal frame of the module according to an embodiment of the invention.

FIG. 15 shows a structure of a metal frame or first frame 150 according to an embodiment of the invention.

The metal frame 150 can also have an protruded portion "J" for passage of the cables 27a and 27b. The protruded portion "J" of the main frame is not essential in this invention, since the outlet portion or cable guide 50 of FIG. 8 is mainly formed by the lower cover 130. On the other hand, if the protruded portion "J" of the main frame 150 forms the outlet portion or cable guide 50 for the cable 27, the protruded portions "H" and "I" of the cover are not needed.

Figure 16:
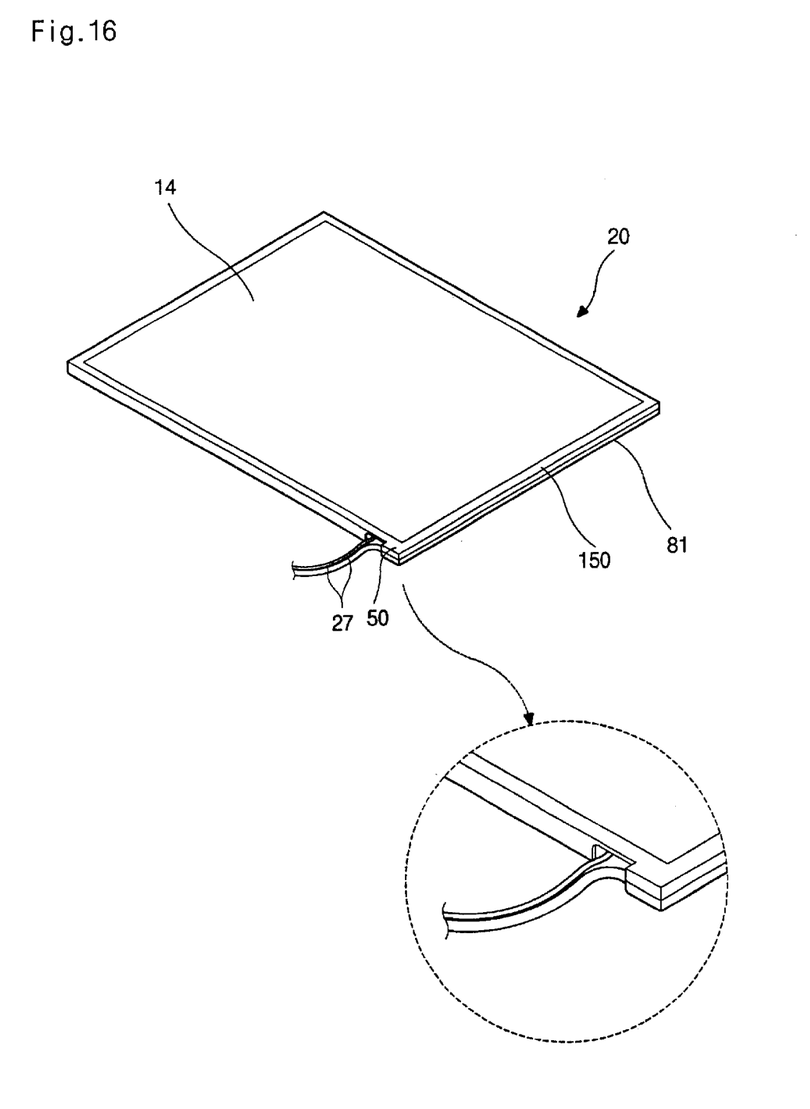
FIG. 16 is a perspective view illustrating an assembled module according to an embodiment of the invention.

FIG. 16 shows the assembled liquid crystal display module 81 according to the embodiments of the invention. As described above, the outlet portion or cable guide 50 is formed at a corner of a rectangular shape of the module 81 at a side corresponding to the lamp 30 (see FIG. 3). In order to form the outlet portion or cable guide 50, only one of the cover 130 and the metal frame 150 need have a protruded portion. If, the metal frame 150 forms the outlet portion or cable guide 50, the cover 130 can be omitted with the main frame having four sides and protruded portion "G" (see FIG. 12).

This protruded outlet portion or cable guide 50 is formed at a small space between the hinge frame 24 and the module 81, thereby protecting the cables 27 from breaking by the hinge frame 24 or any pulling force without increasing the total size of the display assembly.

The handling including assembling of the module can be easier since the cable needs not detour around the assembling member 24b extended from the hinge frame 24a (see FIG. 8) and directs to the inverter 26.

Figure 17:
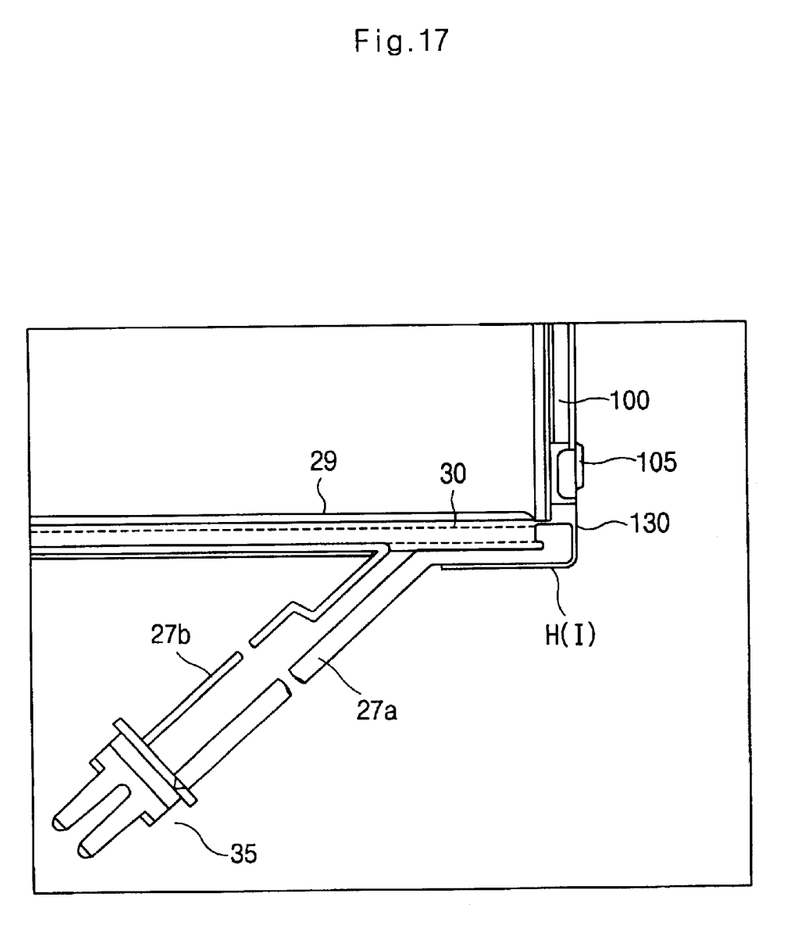
FIG. 17 is a partial cross section view illustrating assembling of a backlight device according to one of the embodiments of the invention.

FIG. 17 shows an example of assembling of the back light device according to the invention. The lamp housing 29 having the lamp 30, and the cables 27a and 27b connected to both ends of the lamp 30 are supported by the main frame 100 a00 and the cover 130 which are assembled by a screw 105. The first cable 27a for high voltage is guided to a center of the lamp 30 by the protruded portion H or I of the cover 130 (see FIGS. 13 and 14). The cables 27a and 27b are connected to the inverter board 26 (FIG. 8) positioned around the center of the lamp 30.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a display panel having side surfaces and a top surface having a display region;
   a back light device having a lamp supplying light to the display panel, the lamp having opposing ends and a cable;
   a first frame covering peripheral portions of the top surface and side surfaces of the display panel;
   a second frame supporting the display panel and the back light device with the first frame, the second frame having a main surface and a side wall extended and bent from the main surface; and
   a guide member guiding the cable of the lamp, wherein the cable exits the guide member between the opposing ends of the lamp.

2. The module of claim 1, wherein the guide member guides the cable toward a center of the lamp.

3. The module of claim 2, wherein the guide member is fixed to the second frame.

4. The module of claim 3, wherein the guide member is comprised of stainless steel.

5. The module of claim 4, wherein the guide member has a first surface portion fixed to the second frame, and a second surface portion extended and bent from the first surface portion, the second surface portion facing and contacting the side wall of the second frame.

6. The module of claim 5, wherein the second surface portion of the guide member extends along a longitudinal direction of the lamp, a portion of the second surface portion positioned at an end of the lamp having an opening as a passage for the cable and a protrusion for guiding the cable toward the opening.

7. The module of claim 6, wherein the second frame has a protrusion corresponding to the protrusion of the guide member.

8. The module of claim 7, wherein the first frame has a protrusion corresponding to the protrusion of the guide member.

9. A liquid crystal display module, comprising:
   a liquid crystal panel having a display region;
   a back light device having a lamp supplying light to the panel, the lamp having cables at both ends thereof;
   a first frame having a first portion covering a peripheral portion of the display region and a second portion covering a side surface of the panel;
   a second frame having an inner surface, an outer surface and a side surface, and supporting the panel and the back light device with the first frame; and
   a fixing unit positioned at a corresponding position of the lamp of the back light device, and having a first surface portion having a guiding portion guiding cables of the lamp toward a longitudinal center of the lamp, wherein the cables exit the guiding portion between both ends of the lamp.

10. The module of claim 9, wherein the second surface portion of the fixing unit contacts the side surface of the second frame, and has a protruded shape having an opening headed to a center of the lamp.

11. A liquid crystal display module, comprising:
    a liquid crystal display panel having a display region;
    a back light device having a lamp supplying light to the panel, the lamp having cables at both ends thereof;
    a first frame having a first portion covering a peripheral portion of the display region and a second portion covering a side surface of the panel;
    a second frame supporting the panel and the back light device with the first frame; and
    a fixing unit positioned at a corresponding position of the lamp, fixed to the second frame, elongated in a longitudinal direction of the lamp to define a side of the second frame, and having a guide portion guiding the cables to a center of the lamp, wherein the cables exit the guide portion between both ends of the lamp.

12. A liquid crystal display module, comprising:
    a liquid crystal display panel having a display region;
    a back light device having a lamp supplying light to the panel, the lamp having cables at both ends thereof;
    a first frame having a first portion covering a peripheral portion of the display region, a second portion covering a side surface of the panel, and a third portion guiding the cables of the lamp from the ends of the lamp to a center of the lamp; and
    a second frame supporting the panel and the back light device with the first frame.

13. The module of claim 12, wherein the third portion of the first frame is positioned at the second portion of the first frame, has a protruded shape at one end of the lamp, and the protruded shape has an opening for cables headed toward the center of the lamp.

14. The module of claim 13, further comprising a fixing unit having a first surface portion fixed to the second frame, a second surface portion perpendicular to the first surface portion, and an opening corresponding to the opening of the third portion of the first frame.

15. A computer, comprising:
    a liquid crystal display module including a) a liquid crystal display panel having a display region, b) a back light device having a lamp supplying light to the panel, the lamp having cables at both ends thereof, c) a first frame having a first portion covering a peripheral portion of the display region, a second portion covering a side surface of the panel and a third portion guiding the cables of the lamp, and d) a second frame supporting the panel and the back light device with the first frame;

a case for holding the display module;

an inverter board supplying electricity to the lamp of the back light device through the cables;

a system body assembled with the display module via a hinge mechanism; and wherein the third portion of the first frame guides the cables toward the inverter board.

16. A computer, comprising:

a liquid crystal display module including a) a liquid crystal display panel having a display region, b) a back light device having a lamp supplying light to the panel, the lamp having cables at both ends thereof, c) a first frame having a first portion covering a peripheral portion of the display region and a second portion covering a side surface of the panel, d) a second frame having supporting the panel and the back light device with the first frame, and e) a guide member guiding the cables of the lamp;

a case holding the display module;

an inverter board supplying electricity to the lamp of the back light device through the cables;

a system body assembled with the display module via a hinge mechanism; and wherein the guide member guides the cables toward the inverter board, wherein the cables exit the guide member between both ends of the lamp.

17. A liquid crystal display module, comprising:

a liquid crystal display panel having a display region;

a back light device having a lamp supplying light to the panel, the lamp having cables at both ends thereof;

a first frame having a first portion covering a peripheral portion of the display regions and a second portion covering a side surface of the panel;

a second frame supporting the panel and the back light device with the first frame, the second frame having a main surface, and having a side wall extended from and generally perpendicular to the main surface, wherein the side wall comprises exactly three side portions, including first and second side portions substantially parallel to each other and a third side portion connecting the first and second side portions and substantially perpendicular to the first and second side portions; and a cable guide for guiding at least one of the cables, wherein at least one of the cables exit the cable guide between both ends of the lamp.

18. The module of claim 17, wherein said second frame further comprises a supporting member extending from one of the first and second portions of the side wall for supporting passage of the cables therebeneath.

19. The module of claim 18, wherein said supporting member extends substantially parallel to the third side portion of the side wall between the first and second portions of the side wall.

20. The module of claim 18, wherein said supporting member includes a protrusion extending substantially perpendicular to the supporting member.

21. The module of claim 18, wherein said second frame further comprises a second supporting member extending from an other of the first and second portions of the side wall for supporting passage of the cables therebeneath.

22. The module of claim 17, further comprising a lower cover having the cable guide for guiding at least one of the cables.

23. The module of claim 17, wherein the first frame includes the cable guide for guiding at least one of the cables from the ends of the lamp to a center of the lamp.

24. A liquid crystal display module, comprising:

a liquid crystal display panel having a display region;

a back light device having a lamp supplying light to the panel, the lamp having cables at both ends thereof;

a first frame having a first portion covering a peripheral portion of the display region and a second portion covering a side surface of the panel;

a second frame supporting the panel and the back light device with the first frame, the second frame having a main surface and a side wall, wherein the side wall has four sections including first and second sections which are substantially perpendicular to the first and second side portions, and wherein exactly three of the four section have a lower portion extending substantially perpendicular to the main surface; and a cable guide for guiding at least one of the cables, wherein at least one of the cables exit the cable guide between both ends of the lamp.

25. The module of claim 24, further comprising a lower cover having the cable guide for guiding at least one of the cables.

26. The module of claim 24, wherein the first frame includes the cable guide for guiding at least one of the cables from the ends of the lamp to a center of the lamp.

* * * * *